Feb. 14, 1967  D. E. LYTLE, SR., ET AL  3,304,005
PIPE HEATING SYSTEM FOR TRAILERS
Filed March 12, 1965
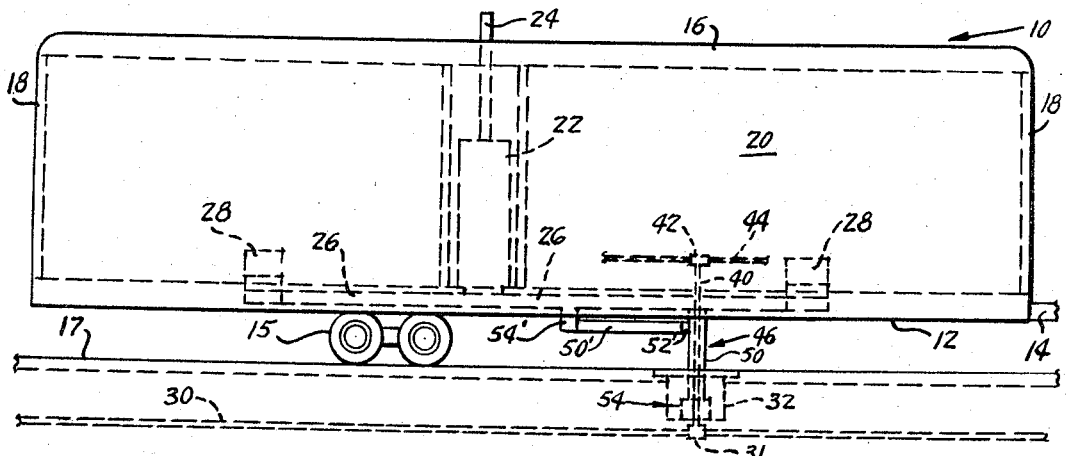
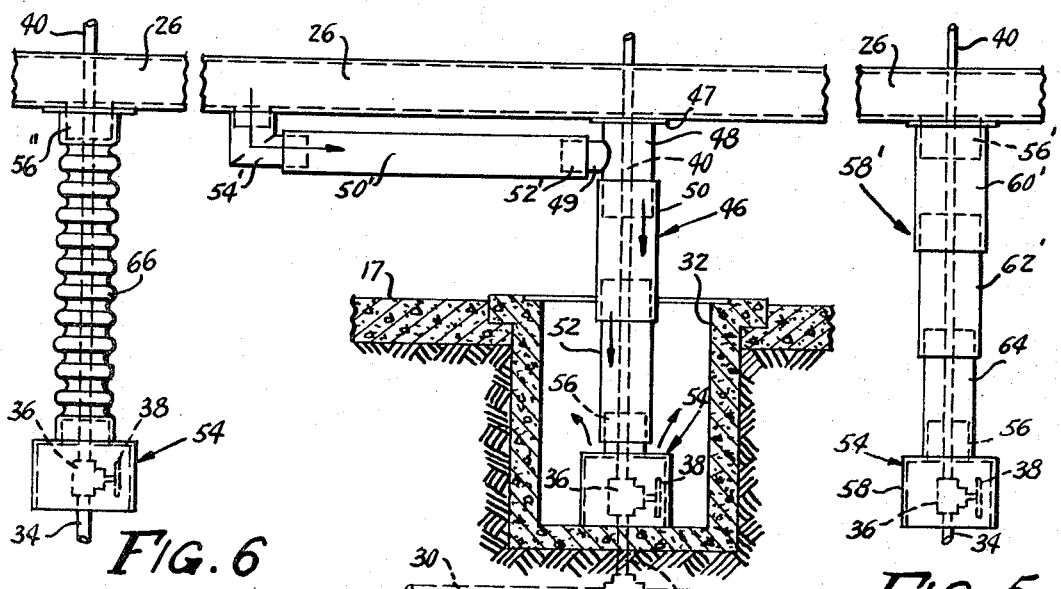
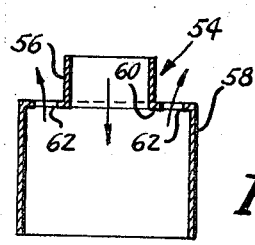
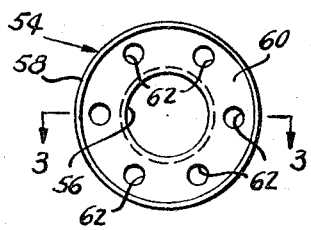
INVENTORS.
DONALD E. LYTLE, SR.
FRANK A. WALLACE
BY Kimmel, Crowell & Weaver
ATTORNEYS.

United States Patent Office 3,304,005
Patented Feb. 14, 1967

3,304,005
PIPE HEATING SYSTEM FOR TRAILERS
Donald E. Lytle, Sr., and Frank A. Wallace, both of 4037 Lockbourne Road, Columbus, Ohio 43207
Filed Mar. 12, 1965, Ser. No. 439,188
4 Claims. (Cl. 237—30)

This invention relates to improvements in stationary trailers and particularly to house trailers.

House trailers customarily have a water connection so that the interior water system of the trailer may be connected to an existing water distribution system, as in a trailer park. It has been found that the exposed water pipe leading from the existing distribution system to the trailer frequently freezes in cold weather, thereby depriving the trailer of water and frequently causing the pipes to burst, or otherwise damaging the plumbing.

It is accordingly a primary object of this invention to obviate such freezing of water pipes associated with a mobile trailer.

It is another object of the instant invention to provide means for precluding the freezing of such water pipes using the heating system of the mobile trailer.

Another object of this invention is to provide easily operable means for precluding the freezing of outside water pipes associated with a house trailer.

Other objects and advantages of this invention inhere in the combination of elements, arrangements of parts, and features of construction and operation, all as will be more fully pointed out hereinafter and disclosed in the accompanying drawings wherein there is shown a preferred embodiment of the inventive concept.

In the drawings:

FIGURE 1 is a schematic showing of a house trailer embodying the instant invention;

FIGURE 2 is a more detailed view, partly in section, of one form of a connection between an existing water outlet and a trailer embodying the instant invention;

FIGURE 3 is a sectional view of the water valve cover taken substantially along the line 3—3 of FIGURE 4 as viewed in the direction indicated by the arrows;

FIGURE 4 is a plan view of the water valve cover;

FIGURE 5 shows another embodiment of a pipe protecting connection between a mobile trailer and an existing water valve; and FIGURE 6 shows still another embodiment of a similar pipe protecting connection between a mobile trailer and an existing water valve.

Similar reference characters refer to similar parts throughout the several views of the drawing.

Referring now in detail to the accompanying drawings and in particular to FIGURE 1, a mobile trailer shown generally at 10, which may be of any conventional form, comprises a structural floor member 12 attached to a drawbar 14 for attachment to a towing vehicle. The trailer 10 is provided with a conventional wheel assembly 15 resting on a ground surface 17. A boxlike structure comprising a roof 16, end walls 18 and side walls 20 provides the customary sheltered living area.

A forced air heating device 22 is provided in the living area and has an exhaust 24 and warm air ducts 26 leading to a plurality of warm air registers 28. Conventional means, not shown, may provide for the recirculation of air from within the living area. The forced air heater 22 is of the conventional type where a combustible mixture is burned, providing a source of heat, across which is blown a stream of air.

Situated beneath ground surface 17 is an existing water distribution system, one branch of which comprises a water line 30 in which is located an outlet T 31. As is customarily provided in trailer parks or the like, a cement-lined pit 32 is placed over outlet T 31, with a galvanized pipe 34 or the like providing communication between the outlet T 31 and the atmosphere.

A valve 36 having a handle 38 acts as a closeable conduit between outlet pipe 34 and a pipe 40 which passes through floor 12, adjacent to conduit 26 to connect through T 42 to the interior water system 44 of the trailer. An existing difficulty with such a connective system is that the valve 36 and pipe 40 may easily freeze during a spell of cold weather, thus depriving the inhabitants of the trailer of water for an indefinite period of time.

It has been found convenient and economical to utilize a portion of the heated air produced by the forced air heater to warm these exposed pipes. FIGURE 2 discloses one embodiment of the inventive concept which is peculiarly adapted to use as a modification of existing trailers. A telescoping chamber shown generally at 46 comprises a flange and collar 47 affixed to the trailer in concentric relation to pipe 40. A first telescoping member 48 which has an inlet 49 and a second telescoping member 50, which may be internally provided with annular sealing means to prevent the loss of air flowing therethrough, provide fluid communication to a third telescoping member 52. At the lower end of the third telescoping member 52 a water valve cover 54 is provided which covers both valve 36 and handle 38. Valve cover 54 comprises an upper throat 56 adapted to fit inside member 52 and an enlarged lower cylinder 58. Throat 56 and cylinder 58 are connected by an annular plate 60 having a series of outlet apertures 62 therein.

The upper end 48 of the telescoping chamber 46 is connected to heating duct 26 by a transfer duct 50' having suitable connections 52', 54' at each end thereof. Thus it is seen that a portion of the heated air from heater 22 is forced through duct 26, transfer duct 50', through telescoping chamber 46 and out apertures 62, thus providing a heating medium to prevent the outside water pipes of the mobile trailer from freezing.

A valve may be provided at the junction of the L-shaped connection 54 and operable from inside the trailer in order to preclude the wastage of heat during comparatively warm weather. Likewise it is within the scope of this invention to provide, if desired, an outside thermostat automatically to open such a valve, thus obviating the need for the conscious attention of an inhabitant of the trailer.

In initially equipping a new trailer with apparatus embodying the instant invention, it is desirable to utilize either of the embodiments shown in FIGURES 5 or 6. In FIGURE 5 the pipe 40 extends to the interior water system 44 as in the previously discussed embodiment. The heating duct 26 is provided with an outlet flange and collar 56' through which the water pipe extends. A telescoping chamber 58', similar to that of FIGURE 2, comprises a first outer pipe 60', an intermediate pipe 62', and a lower pipe 64. In this embodiment, as in that of FIGURE 2, the respective telescoping members may be releasably secured as by set screws or the like. Lower pipe 64 is provided with a valve cover 54 of the type previously described.

The embodiment of FIGURE 6 is of generally the same construction as that of FIGURE 5 except an accordion-like tube 66 is provided in lieu of telescoping chamber 58'. As is true of the other embodiments, tube 66 may be made of an insulating material, or may be interiorly or exteriorly coated with such a substance. In this embodiment, as in that of FIGURE 5, the outlet collar 56" is placed over valve 36 with pipe 40 passing through conduit 26 into the trailer interior.

From the foregoing it will now be seen that there is provided an improved mobile trailer which accomplishes all the objects of this invention and others, including many advantages of great practical utility and commercial importance.

As many embodiments may be made within this inventive concept, and as many modifications may be made in the embodiments hereinbefore shown and described, it is to be understood that all matter herein is to be interpreted merely as illustrative and not in a limiting sense.

We claim:

1. In combination with a mobile trailer including an interior area having a floor, an internal forced air heating system including a furnace contained in the trailer, at least one heated air conduit, and an internal water distribution system including a pipe adapted to be connected to a fitting leading from an external source of water supply, the improvement which consists in providing an extensible hollow covering enclosing said pipe and adapted to enclose said fitting and providing a connecting conduit from said one conduit to said covering to provide heated air from said internal forced air heating system around said pipe and the fitting to prevent freezing thereof.

2. The device of claim 1 wherein said covering includes an extensible and contractible member surrounding said water pipe.

3. The device of claim 2 wherein said extensible and contractible member comprises a series of telescoping tubular sections.

4. The device of claim 2 wherein said extensible and contractible member comprises an accordion-like tube.

References Cited by the Examiner

UNITED STATES PATENTS

| 2,009,823 | 7/1945 | Van Vulpen | 237—5 |
| 2,351,096 | 6/1944 | Blue | 237—5 X |

FOREIGN PATENTS 541,430  11/1941  Great Britain.

EDWARD J. MICHAEL, *Primary Examiner.*